(12) United States Patent
Smith et al.

(10) Patent No.: US 6,519,102 B1
(45) Date of Patent: Feb. 11, 2003

(54) METHOD AND APPARATUS FOR IMPLEMENTING AN IN-SITU DIGITAL HARMONIC COMPUTATION FACILITY FOR DIRECT ACCESS STORAGE DEVICE (DASD)

(75) Inventors: Gordon James Smith, Rochester, MN (US); Hal Hjalmar Ottesen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/559,996

(22) Filed: Apr. 27, 2000

(51) Int. Cl.$^7$ ................................................. G11B 5/09
(52) U.S. Cl. ........................................... 360/31; 360/75
(58) Field of Search ............................... 360/31, 25, 75

(56) References Cited

U.S. PATENT DOCUMENTS 5,784,296 A * 7/1998 Baker et al. .................. 360/53

* cited by examiner

Primary Examiner—David Hudspeth
Assistant Examiner—Varsha A. Kapadia
(74) Attorney, Agent, or Firm—Joan Pennington

(57) ABSTRACT

A method and apparatus are provided for implementing an in-situ digital harmonic computation facility for direct access storage device (DASD). A digital sequence output of a DASD channel from a constant write frequency field on a disk surface is applied to a plurality of adders for modulo-n summing the digital sequence. A harmonics computation block provides discrete Fourier transform computing based upon the summed modulo-n digital sequence to produce a plurality of harmonic coefficients. A plurality of estimate functions utilize predetermined ones of the plurality of harmonic coefficients for estimation of predefined conditions in the DASD. The plurality of estimate functions include a flyheight estimate function, a readback signal asymmetry estimate function and a thermal activity estimate function.

14 Claims, 2 Drawing Sheets

METHOD AND APPARATUS FOR IMPLEMENTING AN IN-SITU DIGITAL HARMONIC COMPUTATION FACILITY FOR DIRECT ACCESS STORAGE DEVICE (DASD)

FIELD OF THE INVENTION

The present invention relates generally to the data processing field, and more particularly, relates to a method and apparatus for implementing an in-situ digital harmonic computation facility for direct access storage device (DASD).

DESCRIPTION OF THE RELATED ART

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks.

Data located on a particular track on a disk surface is read or written by properly positioning a data transducer head directly over the track. In order to maintain the head in proper position over the data track, track-following servo systems often are incorporated into disk drives. Servo position control is used to position the data heads in registration with the data information tracks. A sector servo system uses the data heads as servo transducers in a time-multiplexed fashion. As a head is following a particular track on a rotating disk, the head will pick up data information and servo information alternately. Servo information, interlaced with data information, is prewritten on the disk surfaces at manufacturing time within narrow radial sectors as spokes on a wagon wheel. A servo system that interlaces data and servo information is commonly referred to as sector servo or embedded servo. Another servo system uses a dedicated servo transducer head to read position signals recorded in servo information tracks on a dedicated disk surface. The data heads are ganged with the servo head for simultaneous movement relative to the data information tracks and the servo information tracks. To access the disk drive unit, a feedback sector servo controlled drive system locates the head in a desired position, where data is to be written or read.

Techniques for detecting disk surface defects are known. Most commercially available disk drives store a standard primary defect list (P-list) and a grown defect list (G-list) in a protected area of the disk drive, often referred to as disk defect logs. The P-list is generated for each disk file at manufacturing time and stores information of specific locations of magnetic surface defect sites and the alternate site for storing data. The G-list is generated and periodically updated while the disk drive is in use including stored information of grown defects that occurred after manufacturing. Special manufacturing slider-glide-test procedures, such as Harmonic Ratio Flyheight (HRF) typically are used to estimate flying height and Clearance Modulation Detection (CMD) typically used to detect the presence of raised disk asperities in direct access storage device (DASD). Currently many direct access storage devices (DASDs) include a General Error Measurement (GEM) facility for error detection.

It is desirable to provide an improved method and apparatus for detection of error and critical conditions in a DASD. It is desirable to provide a simpler and more computationally efficient method to perform functions than presently executed in the GEM facility.

SUMMARY OF THE INVENTION

A principal object of the present invention is to provide a method and apparatus for implementing an in-situ digital harmonic computation facility for direct access storage device (DASD). Other important objects of the present invention are to provide such method and apparatus for implementing an in-situ digital harmonic computation facility for direct access storage device (DASD) substantially without negative effect; and that overcome many of the disadvantages of prior art arrangements.

In brief, a method and apparatus are provided for implementing an in-situ digital harmonic computation facility for direct access storage device (DASD). A digital sequence output of a DASD channel from a constant write frequency field on a disk surface is applied to a plurality of adders for modulo-n summing the digital sequence. A harmonics computation block provides discrete Fourier transform computing based upon the modulo-n summed digital sequence to produce a plurality of harmonic coefficients. A plurality of estimate functions utilize predetermined ones of the plurality of harmonic coefficients for estimation of predefined conditions in the DASD.

In accordance with features of the invention, the plurality of estimate functions include a flyheight estimate function, a readback signal asymmetry estimate function and a thermal activity estimate function.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
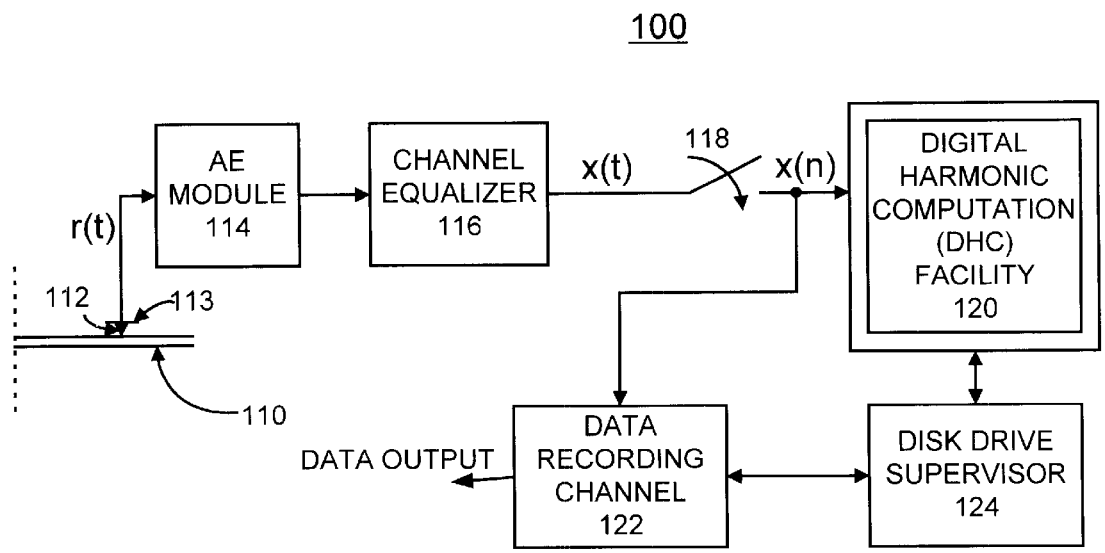
FIG. 1 is a block diagram representation illustrating a direct access storage device (DASD) for implementing an in-situ digital harmonic computation facility in accordance with the preferred embodiment.

Having reference now to the drawings, in FIG. 1, there is shown a direct access storage device (DASD) of the preferred embodiment generally designated by the reference character 100. As shown in FIG. 1, direct access storage device (DASD) 100 includes a recorded disk 110 that is spun at constant speed and a recording head 112 carried by a slider 113 that is positioned on a given track for reading information stored on that track. The readback signal r(t) is highpass-filtered by an arm electronic (AE) module 114, and its filtered output is bandpass-filtered through a channel equalizer 116. An equalized channel equalizer output x(t) is sampled by an analog-to-digital converter (A/D) 118 to provide a discrete-time digital sequence x(n). The digital sequence x(n) is then sent to a digital harmonic computation (DHC) facility 120 of the preferred embodiment and onto a data recording channel 122. A disk drive supervisor 124 monitors the results of the DHC facility 120 and may as a result alter features within the data recording channel 122 or may notify the system operator of drive status and impending problems. Data is output to the host system as indicated at a line labeled DATA OUTPUT.

In accordance with features of the preferred embodiment, the digital harmonic computation (DHC) facility 120 is used to monitor various conditions of the DASD 100, eliminating the need for the conventional General Error Measurement (GEM) facility. Digital harmonic computation (DHC) facility 120 enables a digital implementation of all current GEM methods using a simpler harmonic analysis.

Figure 2:
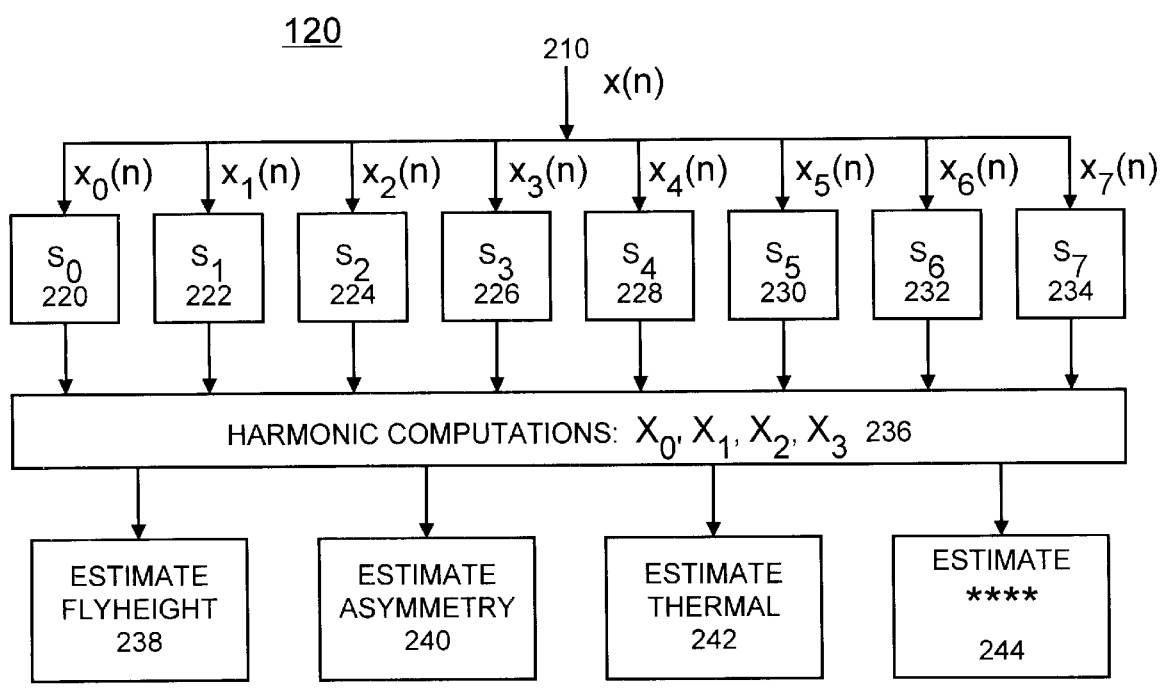
FIG. 2 is a block diagram representation illustrating the in-situ digital harmonic computation facility in accordance with the preferred embodiment.

Referring to FIG. 2, a detailed diagram of the digital harmonic computation (DHC) facility 120 of the preferred embodiment is shown. The digital sequence x(n) is obtained from a write recovery field (WRF) which is the preamble to each servo sector on the disk surface or other constant write frequency field on a disk surface. For example, in one known DASD spinning at 10,000 RPM, the write recovery field has a written, frequency of fw=33.125 MHz and is sampled at fs=265 MHz, which is exactly eight times the written frequency. In this example, fs=8*fw. In general, the sampling frequency fs is a multiple integer of the write frequency fw. In FIG. 2, the digital sequency x(n) on line 210 is indexed on a modulo-8 basis, such that every eight sample of x(n) goes to a respective adder $S_i$ including $S_0$ 220, $S_1$ 222, $S_2$ 224, $S_3$ 226, $S_4$ 228, $S_5$ 230, $S_6$ 232, and $S_7$ 234. As shown in the following Equation 1, a sequence x(n) of length N is summed modulo-8 by the adder $S_i$. Note that the sequence length N is divisible by eight. Examples are N=16, 24, 32 or the like. It should be understood that the principles of the present invention are not limited to modulo-8 summing, various modulo-n can be used, where n represents an integer number.

$$S_i = \sum_{m=0}^{N/8} x(i+8m), \quad i = 0, 1, 2, \ldots, 7. \qquad \text{Equation 1}$$

The sequence x(n) modulo-8 summing may be obtained from part of a write recovery field (WRF) within a servo sector or it could be the whole WRF, or it could be a modulo-8 sum of all WRFs around a given track. An alternative to using the WRF is to write similar patterns at other places on a disk surface. The only requirement is that each adder has the same number of samples. Note that the computational requirements for the modulo-8 summing by the eight adders $S_0$ 220, $S_1$ 222, $S_2$ 224, $S_3$ 226, $S_4$ 228, $S_5$ 230, $S_6$ 232, and $S_7$ 234 are very low. After the desired number of samples N (divisible by eight) have been taken, then a discrete Fourier transform (DFT) is computed at a harmonic computations block 236, based upon the sums Si, i=0, 1, 2, . . . , 7, contained in the eight adders $S_0$ 220, $S_1$ 222, $S_2$ 224, $S_3$ 226, $S_4$ 228, $S_5$ 230, $S_6$ 232, and $S_7$ 234. This is done for the first and third harmonic according to the algorithms set forth in the following Equations 2 and 3, respectively.

$$X(N/8) = R1 + q*R2 - j(I1 + q*I2), \text{ where } q = 0.707 \qquad \text{Equation 2}$$

$$X(3N/8) = R1 + q*R2 - j(I1 + q*I2), \text{ where } q = 0.707 \qquad \text{Equation 3}$$

Where j=sqrt(−1), and the coefficients in terms of the adder sums are defined as follows:

$$R1 = S0 - S4,\ R2 = S1 - S3 - S5 + S7 \qquad \text{Equation 4}$$

$$I1 = S2 - S6,\ I2 = S1 + S3 - S5 - S7 \qquad \text{Equation 5}$$

In similar fashion, the even harmonics have the zeroth and second harmonic defined by Equations 6 and 7, respectively.

$$X(0) = S0 + S1 + S2 + S3 + S4 + S5 + S6 + S7 \qquad \text{Equation 6}$$

$$X(2N/8) = (S0 - S2 + S4 - S6) - j(S1 - S3 + S5 - S7) \qquad \text{Equation 7}$$

Note that the total number of multiplications required in harmonic computations block 236 to produce the four harmonic components in Equations 2, 3, 6 and 7 are equal to four no matter the length N of the sequence X(n).

Estimation of special conditions in the DASD 100 are performed by an estimate flyheight block 238, an estimate asymmetry block 240, an estimate thermal block 242 and an estimate block 244. Estimate flyheight block 238, estimate asymmetry block 240, estimate thermal block 242 and estimate block 244 use the harmonic coefficients $X_0$, $X_1$, $X_2$, and $X_3$ for estimation of special conditions in the DASD 100. For example, if the magnitudes of the four harmonic coefficients $X_0$, $X_1$, $X_2$, $X_3$ are $M_0$, $M_1$, $M_2$, $M_3$, respectively, then an estimate of the flyheight d using a harmonic ratio frequency (HRF) technique in estimate flyheight block 238 can be found using an inverse of Wallace's equation as set forth in the following Equation 8.

$$d = (\lambda_1/4\pi)\ln(M_1/M_3) \qquad \text{Equation 8}$$

where $\lambda_1$ is the spatial wavelength of the written pattern.

In accordance with features of the preferred embodiment, the asymmetry in the readback signal can be interpreted as a damaged read element or head instability. Asymmetry shows up as distortion in the readback signal and appears in the second harmonic component. A normalized second harmonic distortion $Q_2$ estimated in the estimate asymmetry block 240 can be defined as set forth in the following Equation 9.

$$Q_2 = M_2/M_1 \qquad \text{Equation 9}$$

The larger the value of $Q_2$, the more asymmetry is present or a larger value of $Q_2$ means that more asymmetry is present.

In the estimate thermal block 242, the severity of any short term, thermal activity, such as resulting from baseline wander and thermal asperities, will manifest itself proportionally in the normalized zeroth harmonic component $Q_0$ is defined as set forth in the following Equation 10.

$$Q_0 = M_0/M_1 \qquad \text{Equation 10}$$

While the present invention has been described with reference to the details of the embodiments of the invention shown in the drawing, these details are not intended to limit the scope of the invention as claimed in the appended claims.

What is claimed is:

1. Apparatus for implementing an in-situ digital harmonic computation facility for direct access storage device (DASD) comprising:

a digital sequence output of a DASD channel from a constant write frequency field on a disk surface;

a plurality of adders for modulo-n summing said digital sequence; said modulo-n equals modulo-8 and said plurality of adders for modulo-8 summing said digital sequence being represented by Equation 1 where said digital sequence x(n) of length N is summed modulo-8 by said adder $S_i$ and a sequence length N is divisible by eight;

$$S_i = \sum_{m=0}^{N/8} x(i+8m), \quad i = 0, 1, 2, \ldots, 7 \qquad \text{Equation 1}$$

a harmonics computation block for discrete Fourier transform computing based upon said modulo-n summed digital sequence to produce a plurality of harmonic coefficients;

a plurality of estimate functions utilizing predetermined ones of said plurality of harmonic coefficients for estimation of predefined conditions in said DASD.

2. Apparatus for implementing an in-situ digital harmonic computation facility for direct access storage device (DASD) as recited in claim 1 wherein said plurality of harmonic coefficients include a first harmonic and a third harmonic represented by respective Equations 2 and 3;

$$X(N/8)=R1+q*R2-j(I1+q*I2), \text{ where } q=0.707 \quad \text{Equation 2}$$

$$X(3N/8)=R1+q*R2-j(I1+q*I2), \text{ where } q=0.707 \quad \text{Equation 3;}$$

where j=sqrt(-1), and the coefficients in terms of the adder sums of said plurality of adders for modulo-8 summing said digital sequence are defined by Equations 4 and 5:

$$R1=S0-S4, R2=S1-S3-S5+S7 \quad \text{Equation 4}$$

$$I1=S2-S6, I2=S1+S3-S5-S7 \quad \text{Equation 5.}$$

3. Apparatus for implementing an in-situ digital harmonic computation facility for direct access storage device (DASD) as recited in claim 2 wherein said plurality of harmonic coefficients include a zeroth harmonic and a second harmonic represented by respective Equations 6 and 7;

$$X(0)=S0+S1+S2+S3+S4+S5+S6+S7 \quad \text{Equation 6}$$

$$X(2N/8)=(S0-S2+S4-S6)-j(S1-S3+S5-S7) \quad \text{Equation 7;}$$

where j=sqrt(-1).

4. Apparatus for implementing an in-situ digital harmonic computation facility for direct access storage device (DASD) as recited in claim 3 wherein said plurality of estimate functions utilizing predetermined ones of said plurality of harmonic coefficients for estimation of predefined conditions in said DASD use said zeroth harmonic coefficient, said first harmonic coefficient; said second harmonic coefficient and said third harmonic coefficient for estimation of predefined conditions in said DASD.

5. Apparatus for implementing an in-situ digital harmonic computation facility for direct access storage device (DASD) as recited in claim 3 wherein said plurality of estimate functions include a flyheight estimate function and said flyheight estimate function of flyheight d uses a harmonic ratio frequency (HRF) technique using an inverse of Wallace's equation as set forth in the following Equation 8;

$$d=(\lambda_1/4\pi)\ln(M_1/M_3) \quad \text{Equation 8;}$$

where $\lambda_1$ is the spatial wavelength of the written pattern, and $M_1$ and $M_3$ respectively represent a magnitude of said first harmonic coefficient and said third harmonic coefficient.

6. Apparatus for implementing an in-situ digital harmonic computation facility for direct access storage device (DASD) as recited in claim 3 wherein said plurality of estimate functions include an asymmetry estimate function and said asymmetry estimate function estimates asymmetry in a readback signal in said DASD channel; said asymmetry estimate function is represented the following Equation 9;

$$Q_2=M_2/M_1 \quad \text{Equation 9}$$

where $M_1$ and $M_2$ respectively represent a magnitude of said first harmonic coefficient and said second harmonic coefficient and a larger value of $Q_2$ represents more asymmetry in said readback signal.

7. Apparatus for implementing an in-situ digital harmonic computation facility for direct access storage device (DASD) as recited in claim 1 wherein said plurality of estimate functions include a thermal estimate function and said thermal estimate function estimates thermal activity and said thermal estimate function is represented the following Equation 10;

$$Q_0=M_0/M_1 \quad \text{Equation 10;}$$

where $M_0$ and $M_1$ respectively represent a magnitude of said zeroth harmonic coefficient and said first harmonic coefficient.

8. A method for implementing an in-situ digital harmonic computation facility for estimating predefined conditions in direct access storage device (DASD) comprising the steps of:

receiving a digital sequence output x(n) of a DASD channel from a constant write frequency field on a disk surface;

modulo-n summing said digital sequence; said digital sequence x(n) represented by Equation 1 of length N being-summed modulo-n by adders represented by $S_i$ and a sequence length N being a multiple integer divisible by n;

$$S_i = \sum_{m=0}^{N/n} x(i+8m), \quad i=0,1,2,\ldots,n-1 \quad \text{Equation 1}$$

computing discrete Fourier transform based upon said modulo-n summed digital sequence and producing a plurality of harmonic coefficients; and utilizing predetermined ones of said plurality of harmonic coefficients for estimation of the predefined conditions in said DASD.

9. A method for implementing an in-situ digital harmonic computation facility for estimating predefined conditions in direct access storage device (DASD) as recited in claim 8 wherein said step of modulo-n summing said digital sequence includes modulo-8 summing said digital sequence and wherein said step of utilizing predetermined ones of said plurality of harmonic coefficients for estimation of the predefined conditions in said DASD includes the step of utilizing a respective magnitude of a first harmonic coefficient and a third harmonic coefficient for estimating flyheight; said first harmonic and said third harmonic represented by respective Equations 2 and 3;

$$X(N/8)=R1+q*R2-j(I1+q*I2), \text{ where } q=0.707 \quad \text{Equation 2}$$

$$X(3N/8)=R1+q*R2-j(I1+q*I2), \text{ where } q=0.707 \quad \text{Equation 3;}$$

where j=sqrt(-1), and the coefficients in terms of the adder sums of said plurality of adders for modulo-8 summing said digital sequence are defined by Equations 4 and 5:

$$R1=S0-S4, R2=S1-S3-S5+S7 \quad \text{Equation 4}$$

$$I1=S2-S6, I2=S1+S3-S5-S7 \quad \text{Equation 5.}$$

10. A method for implementing an in-situ digital harmonic computation facility for estimating predefined conditions in direct access storage device (DASD) as recited in claim 8 wherein said step of utilizing predetermined ones of said plurality of harmonic coefficients for estimation of the predefined conditions in said DASD includes the step of utilizing a respective magnitude of a first harmonic coefficient and a second harmonic coefficient for estimating asymmetry in a readback signal in said DASD channel.

11. A method for implementing an in-situ digital harmonic computation facility for estimating predefined conditions in direct access storage device (DASD) as recited in claim 8 wherein said step of utilizing predetermined ones of said plurality of harmonic coefficients for estimation of the predefined conditions in said DASD includes the step of utilizing a respective magnitude of a zeroth harmonic coefficient and a first harmonic coefficient for estimating thermal activity.

12. A direct access storage device (DASD) comprising:

at least one disk mounted for rotation;

a transducer mounted for movement across tracks recorded on the at least one disk and providing a readback signal, each disk surface including a constant write frequency field on said disk surface;

a DASD channel providing a digital sequence output from said constant write frequency field;

said DASD being characterized by apparatus for implementing an in-situ digital harmonic computation facility including;

a plurality of adders for modulo-n summing said digital sequence; said modulo-n equals modulo-8; said digital sequence x(n) represented by Equation 1 of length N being summed modulo-8 by adders represented by $S_i$ and a sequence length N being divisible by 8;

$$S_i = \sum_{m=0}^{N/8} x(i+8m), \quad i = 0, 1, 2, \ldots, n-1 \qquad \text{Equation 1}$$

a harmonics computation block for discrete Fourier transform computing based upon said modulo-n summed digital sequence to produce a plurality of harmonic coefficients; and a plurality of estimate functions utilizing predetermined ones of said plurality of harmonic coefficients for estimation of predefined conditions in said DASD.

13. A direct access storage device (DASD) as recited in claim 12 wherein said plurality of harmonic coefficients include a first harmonic and a third harmonic represented by respective Equations 2 and 3;

$$X(N/8)=R1+q*R2-j(I1+q*I2), \text{ where } q=0.707 \qquad \text{Equation 2}$$

$$X(3N/8)=R1+q*R2-j(I1+q*I2), \text{ where } q=0.707 \qquad \text{Equation 3;}$$

where j=sqrt(−1), and the coefficients in terms of the adder sums of said plurality of adders for modulo-8 summing said digital sequence are defined by Equations 4 and 5:

$$R1=S0-S4, R2=S1-S3-S5+S7 \qquad \text{Equation 4}$$

$$I1=S2-S6, I2=S1+S3-S5-S7 \qquad \text{Equation 5.}$$

14. A direct access storage device (DASD) as recited in claim 12 wherein said plurality of estimate functions include a flyheight estimate function, a readback signal asymmetry estimate function and a thermal activity estimate function.

* * * * *